United States Patent
Yu et al.

(10) Patent No.: US 11,789,315 B1
(45) Date of Patent: Oct. 17, 2023

(54) BACKLIGHT MODULE AND DISPLAY DEVICE

(71) Applicants: MIANYANG HKC OPTOELECTRONICS TECHNOLOGY CO., LTD., Sichuan (CN); HKC CORPORATION LIMITED, Shenzhen (CN)

(72) Inventors: Lang Yu, Sichuan (CN); Rongrong Li, Sichuan (CN)

(73) Assignees: MIANYANG HKC OPTOELECTRONICS TECHNOLOGY CO., LTD., Sichuan (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/069,971

(22) Filed: Dec. 21, 2022

(30) Foreign Application Priority Data

May 10, 2022 (CN) .......................... 202210503960.4

(51) Int. Cl.
*G02F 1/13357* (2006.01)
(52) U.S. Cl.
CPC .............................. *G02F 1/133608* (2013.01)
(58) Field of Classification Search
CPC ......... G02F 1/133608; G02F 1/133314; G02F 1/133317
See application file for complete search history.

(56) References Cited

U.S. PATENT DOCUMENTS

| 2008/0284939 A1 | 11/2008 | Lee et al. |
| 2013/0141665 A1 | 6/2013 | Huang et al. |

FOREIGN PATENT DOCUMENTS

| CN | 101504119 A | | 8/2009 | |
| CN | 202040696 U | | 11/2011 | |
| CN | 205643963 U | | 10/2016 | |
| CN | 207636900 U | | 7/2018 | |
| CN | 108388038 A | * | 8/2018 | ....... G02F 1/133308 |
| CN | 108388038 A | | 8/2018 | |
| CN | 212322566 U | | 1/2021 | |
| CN | 213149429 U | | 5/2021 | |
| CN | 114277267 A | | 4/2022 | |
| CN | 114280849 A | | 4/2022 | |
| KR | 20060133685 A | | 12/2006 | |
| TW | 201405219 A | | 2/2014 | |

* cited by examiner

*Primary Examiner* — Karabi Guharay
(74) *Attorney, Agent, or Firm* — Hodgson Russ LLP (57) ABSTRACT

A backlight module includes a middle frame and a backplate disposed at one side of the middle frame. The middle frame is provided with a connecting post, the backplate is provided with a positioning hole, the connecting post is disposed in the positioning hole. The backlight module also includes a connecting piece disposed at one side of the backplate away from the middle frame and connecting the backplate and connecting post.

16 Claims, 5 Drawing Sheets

BACKLIGHT MODULE AND DISPLAY DEVICE

CROSS-REFERENCE TO RELATED APPLICATIONS

This application claims priority to Chinese Patent Application No. 202210503960.4, filed May 10, 2022, the entire disclosure of which is incorporated herein by reference.

FIELD OF TECHNOLOGY

The present application relates to the display field, more particularly, to a backlight module and a display device.

BACKGROUND

With the wide application of notebook, consumers' requirements for notebook are getting higher and higher. Large screen, narrow bezel, light weight and technological innovation have become the four major trends of notebook development. Most notebook displays in the market are liquid crystal displays. Liquid crystal displays are non-active luminous electronic devices, which do not possess light emitting characteristics. They must rely on the light emitted by the light source in the backlight module to obtain display performance. The brightness of liquid crystal displays depends on its backlight module. It can be seen that the performance of backlight module directly affects the display quality of notebook display.

The two main positioning components in the backlight module are the middle frame and the backplate. Abnormal positioning of the middle frame and the backplate can easily lead to the optical diaphragm falling off, bending deformation, light leakage and other phenomena, which will lead to abnormal display picture, which is a problem that should not be underestimated.

SUMMARY

There are provided a backlight module and a display device according to embodiments of the present application. The technical solution is as below:

According to a first aspect of the present application, there is provided a backlight module, which includes a middle frame provided with a connecting post, a backplate disposed on one side of the middle frame and provided with a positioning hole and a connecting piece disposed at one side of the backplate away from the middle frame. The connecting post is disposed in the positioning hole. The connecting piece connects the backplate and the connecting post.

According to a second aspect of the present application, there is provided provides a display panel, which includes: the described-above backlight module; and a display panel disposed on a side of the backlight module away from a backplate.

It should be understood that the above general description and the following detailed description are exemplary and explanatory only and are not intended to limit the present disclosure.

BRIEF DESCRIPTION OF THE DRAWINGS

The accompanying drawings, which are incorporated in and constitute a part of the description, illustrate embodiments consistent with the present application and, together with the description, serve to explain the principles of the present application. Obviously, the drawings in the following description are merely some embodiments of the present application, from which other drawings may be obtained without exerting inventive effort by those ordinarily skilled in the art.

DETAILED DESCRIPTION OF THE EMBODIMENTS

The exemplary embodiments will now be described more fully with reference to the accompanying drawings. However, the example embodiments can be implemented in a variety of forms and should not be construed as being limited to the examples set forth herein. Rather, these embodiments are provided so that the present application will be more comprehensive and complete, and the concept of example embodiments will be fully communicated to those skilled in the art.

Further, the described features, structures or characteristics may be incorporated in any suitable manner in one or more embodiments. In the following description many specific details are provided to give a full understanding of the embodiments of the present application. However, those skilled in the art will appreciate that the technical aspects of the present application may be practiced without one or more of the specific details, or other methods, components, devices, steps and the like may be employed. In other instances, the common methods, device, implementations or operations are not shown or described in detail to avoid obscuring aspects of the present application.

The present application is further described below with reference to the accompanying drawings and specific embodiments. It should be noted that the technical features involved in the different embodiments of the present application described below can be combined mutually in case of no conflict. The following embodiments described with reference to the drawings are illustrative and only used to explain the present application, but may not be interpreted as the restrictions of the present application.

Embodiment 1

Referring to FIGS. 1 to 5, the backlight module in embodiment 1 includes a middle frame 200 and a backplate 100 disposed at one side of the middle frame 200. The backplate 100 may include a bottom plate 120 and a side plate 110 disposed at an edge of the bottom plate 120. The middle frame 200 is provided on the side of the bottom plate 120 close to the side plate 110. The side plate 110 is located outside the middle frame 200 for limiting the position of the middle frame 200. There is a small gap between the side plate 110 and the middle frame 200, or the side plate 110 contacts the middle frame 200. The bottom plate 120 may be a rectangular metal plate, and the middle frame 200 may be a rectangular or door-shaped plastic frame.

The middle frame 200 is provided with a connecting post 210, the bottom plate 120 is provided with a positioning hole 121, the positioning hole 121 may be a round hole, and the main structure of the connecting post 210 may be a cylinder. In a radial direction of the connecting post 210, the connecting post 210 is provided in the positioning hole 121. The backlight module also includes a connecting piece provided on the side of the bottom plate 120 away from the middle frame 200, and the connecting piece connects the bottom plate 120 and the connecting post 210, i.e., the connecting piece connects the backplate 100 and the middle frame 200.

It should be noted that the backplate 100 may include the bottom plate 120 and the side plate 110 provided at the edge of the bottom plate 120 but is not limited thereto, and the backplate 100 may also include only the bottom plate 120, as the case may be. The positioning hole 121 may be a round hole, and the main structure of the connecting post 210 may be a cylinder, but is not limited thereto. The positioning hole 121 may also be provided as a rectangular hole or the like, and the corresponding connecting post 210 may also be provided as a rectangular post, depending on the specific situation. The bottom plate 120 may be a rectangular metal plate, and the middle frame 200 may be a rectangular or door-shaped plastic frame, but is not limited thereto. The specific formation and material of the backplate 100 and the middle frame 200 may be selected according to the structure of the lamp panel and the optical diaphragm of the backlight module.

In the present application, the connecting post 210 is provided on the middle frame 200, the positioning hole 121 is disposed on the bottom plate 120, the connecting post 210 is disposed in the positioning hole 121, and the connecting piece is disposed on the side of the bottom plate 120 away from the middle frame 200. The connecting piece connects the bottom plate 120 and the connecting post 210, that is, the connecting piece connects the backplate 100 and the middle frame 200. Compared with the solution that the middle frame 200 and the bottom plate 120 are directly glued, the technical solution of the present application can avoid glue sticking to the optical diaphragm, thereby avoiding abnormal display pictures.

Further, the connecting piece is provided on the side of the bottom plate 120 away from the middle frame 200 so that the backplate 100 and the middle frame 200 can be more easily disassembled. In an axial direction of the connecting post 210, the backplate 100 and the middle frame 200 are connected by the connecting piece, and in the radial direction of the connecting post 210, the backplate 100 and the middle frame 200 are positioned by the connecting post 210 and the positioning hole 121, so that there is no need to limit the position by the side plate 110, and the middle frame 200 is more easily installed in the middle of the side plate 110 and the assembly efficiency is higher.

Figure 1:
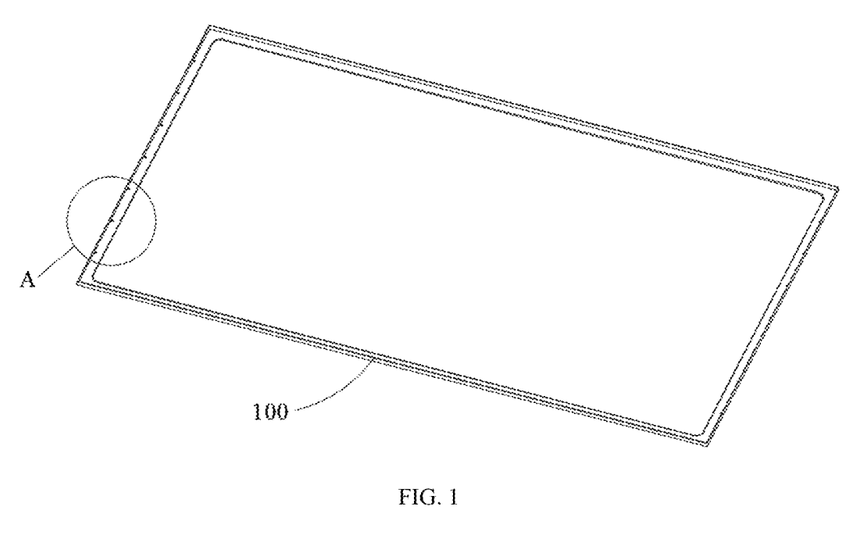
FIG. 1 is a structural diagram of a backplate in embodiment 1 of the present application.
Figure 2:
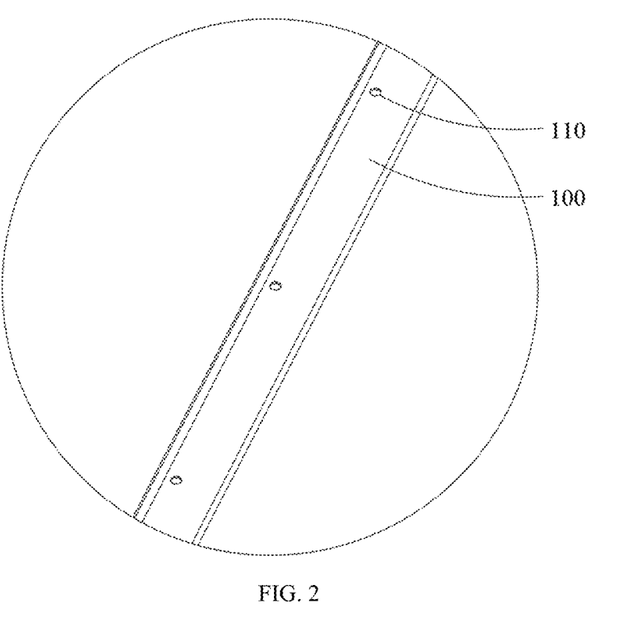
FIG. 2 is an enlarged view of position A of the backplate in FIG. 1.
Figure 3:
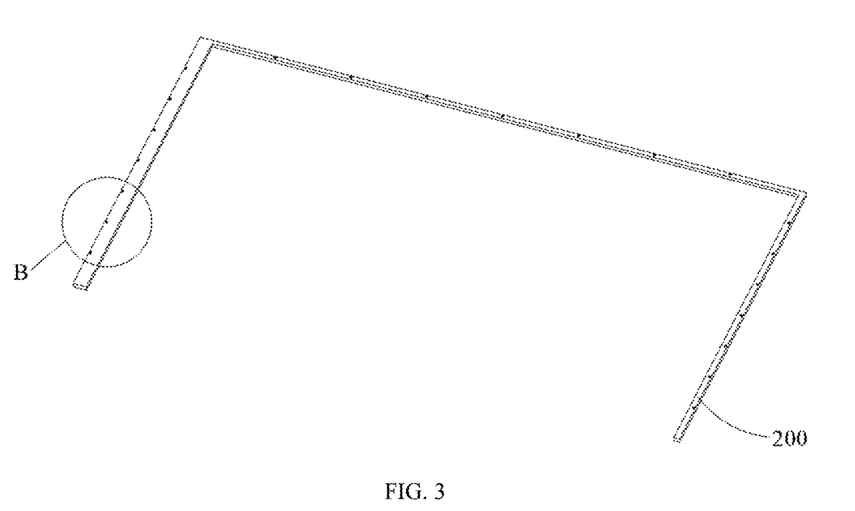
FIG. 3 is a structural diagram of a middle frame in embodiment 1 of the present application.
Figure 4:
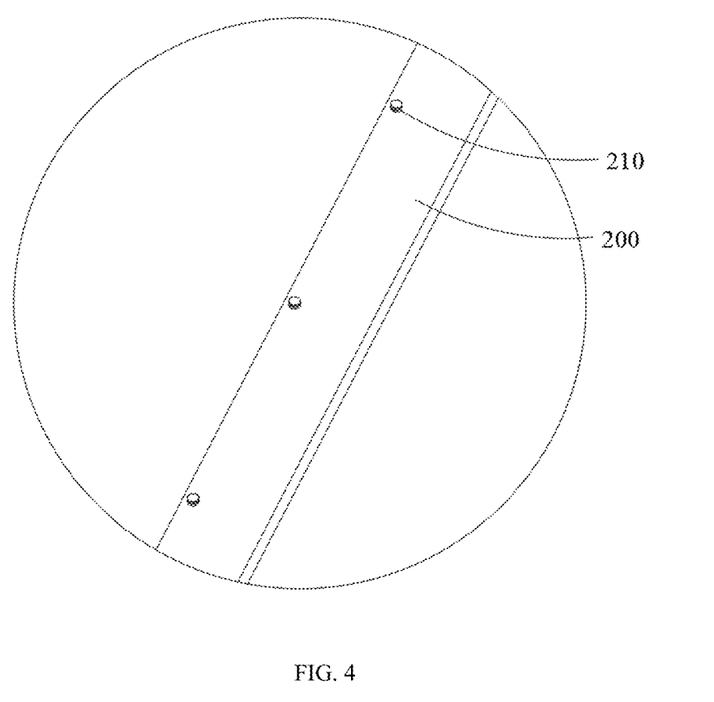
FIG. 4 is an enlarged view of position B of the middle frame in FIG. 3.
Figure 5:
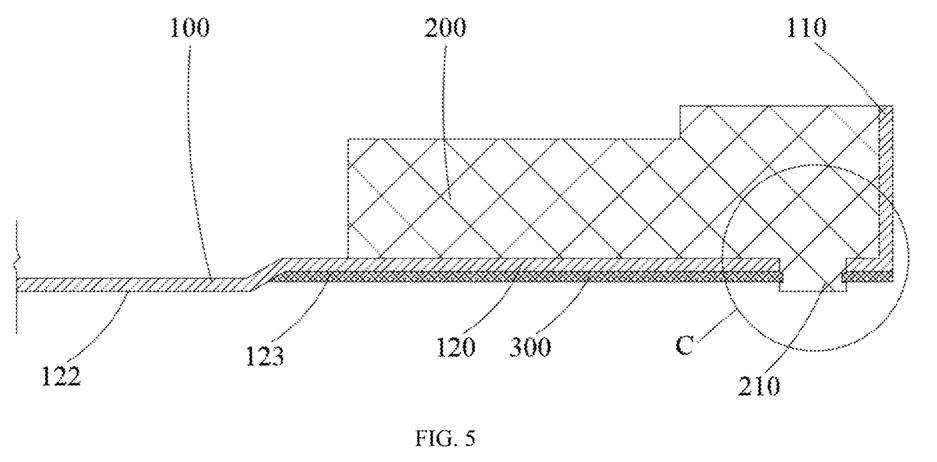
FIG. 5 is a structural diagram of the backlight module in embodiment 1 of the present application.
Figure 6:
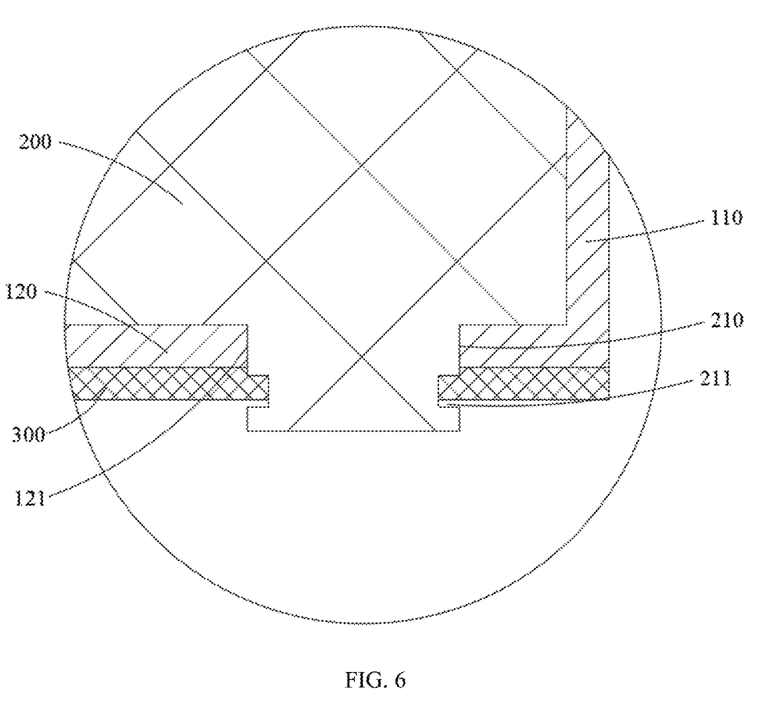
FIG. 6 is an enlarged view of position C of the backlight module in FIG. 5.

FIG. 6 is an enlarged schematic view of the position C of the backlight module in FIG. 5. Referring to FIG. 5 and FIG. 6, the connecting piece includes an adhesive layer 300 through which the bottom plate 120 and the connecting post 210 are bonded. The adhesive layer 300 is formed by solidification of glue applied around the connecting post 210 on the side of the bottom plate 120 away from the middle frame 200.

It should be noted that the connecting piece may include but is not limited to the adhesive layer 300, and the connecting piece may also include a buckle or the like as the case may be.

The connecting piece includes the adhesive layer 300. The adhesive layer 300 is disposed on the side of the bottom plate 120 away from the middle frame 200. Compared with the solution that glue is applied to the side of the bottom plate 120 close to the middle frame 200, the technical solution of the present application has a wider dispensing surface and features easier dispensing, thereby improving production efficiency of the backlight module.

In addition, if glue is applied to the side of the bottom plate 120 close to the middle frame 200, when the middle frame 200 and the backplate 100 are disassembled, the middle frame 200 is easily damaged. Even if the middle frame 200 is not damaged, a large amount of glue will remain on the middle frame 200, and cleaning the residual glue on the middle frame 200 will consume a lot of work. However, in the technical solution of the present application, only the glue solidified on the side of the back bottom plate 120 away from the middle frame 200 needs to be torn off during disassembly, and then the middle frame 200 is removed, so that the disassembly is simple and labor-saving, the removed middle frame 200 is complete and has no damage and no glue residue, thus avoiding unnecessary workload.

Referring to FIGS. 5 and 6, an outer diameter of the connecting post 210 may be less than or equal to, but not limited to, a diameter of the positioning hole 121. In some embodiments, the outer diameter of the connecting post 210 may also be greater than the diameter of the positioning hole 121, i.e., the connecting post 210 is provided with an interference fit with the positioning hole 121.

When the outer diameter of the connecting post 210 is less than or equal to the diameter of the positioning hole 121, the connecting post 210 can be easily installed in the positioning hole 121. Such a design reduces the assembly difficulty of the middle frame 200 and the backplate 100.

When the outer diameter of the connecting post 210 is larger than the diameter of the positioning hole 121, glue on the side of the bottom plate 120 away from the middle frame 200 cannot flow through the positioning hole 121 on the side of the bottom plate 120 close to the middle frame 200, thereby further preventing glue from sticking to the optical diaphragm.

Referring to FIG. 5 and FIG. 6, the connecting post 210 is protruded relative to the side of the backplate 100 away from the middle frame 200. That is, in the axial direction of the connecting post 210, a height of the connecting post 210 is greater than a thickness of the bottom plate 120, so that one end of the connecting post 210 away from the middle frame 200 protrudes from the positioning hole 121.

It should be noted that the height of the connecting post 210 may be larger than, but not limited to, the thickness of the bottom plate 120, and the height of the connecting post 210 may also be smaller than the thickness of the bottom plate 120, that is, one end of the connecting post 210 away from the middle frame 200 may be slightly recessed into the positioning hole 121, as the case may be.

The height of the connecting post 210 is larger than the thickness of the bottom plate 120, and one end of the connecting post 210 away from the middle frame 200 protrudes from the positioning hole 121. When the bottom plate 120 and the connecting post 210 are bonded by the adhesive layer 300, the adhesive surface of the adhesive layer 300 is larger, and the bottom plate 120 and the connecting post 210 can be bonded more firmly, that is, the connection between the backplate 100 and the middle frame 200 is more secure.

Referring to FIG. 5 and FIG. 6, the peripheral surface of the connecting post 210 is provided with an annular groove 211. The annular groove 211 is disposed around an axis of the connecting post 210, i.e., the connecting post 210 may be coaxially provided with the annular groove 211. In the axial direction of the connecting post 210, at least a part of the annular groove 211 is located on the side of the backplate 100 away from the middle frame 200, i.e., outside of the positioning hole 121. In this embodiment, the annular groove 211 is integrally provided outside of the positioning hole 121. The adhesive layer 300 is at least partially disposed within the annular groove 211, i.e., a portion of the adhesive layer 300 fills the annular groove 211 and a portion of the adhesive layer 300 is located outside the annular groove 211.

It should be noted that the annular groove 211 may be provided on the side wall of the connecting post 210, but is not limited thereto, and some pits may be provided on the side wall of the connecting post 210, and the pits may be of any shape, as the case may be.

The connecting post 210 is provided with the annular groove 211, a part of the adhesive layer 300 fills the annular groove 211, and a part of the adhesive layer 300 is located outside the annular groove 211. The slippage between the adhesive layer 300 and the connecting post 210 can be avoided by the annular groove 211, and the bottom plate 120 and the connecting post 210 are more firmly bonded, that is, the backplate 100 can be more firmly connected with the middle frame 200. The annular groove 211 is integrally disposed outside the positioning hole 121, so that glue can easily fill the annular groove 211, and the bottom plate 120 and the connecting post 210 can be bonded more firmly, that is, the connection between the backplate 100 and the middle frame 200 is stronger.

Referring to FIGS. 1 to 4, a plurality of connecting posts 210 are provided and disposed at intervals around the center of the middle frame 200, and a plurality of positioning holes 121 are provided and correspond to the connecting posts 210 one to one, i.e., the number of the positioning holes 121 is equal to the number of the connecting posts 210, and the positioning holes 121 is aligned with the connecting posts 210. When the connecting post is disposed at intervals around the center of the middle frame 200, the outer diameter of the connecting post 210 may be less than the diameter of the positioning hole 121.

It should be noted that the number of the connecting posts 210 may be plural but not limited thereto, and only one connecting post 210 may be provided depending on the case.

A plurality of connecting posts 210 may be provided and disposed at intervals around the center of the middle frame 200. The number and position of the positioning holes 121 are adapted to the connecting posts 210, that is, the backplate 100 and the middle frame 200 are connected together by a plurality of connecting posts 210, so that the backplate 100 and the middle frame 200 can be connected more firmly.

When the backplate 100 and the middle frame 200 are connected together by a plurality of connecting posts 210, the adhesive layer 300 is configured of an integral structure and fills in the annular groove 211 of each of the connecting posts 210, that is, glue isn't dispensed around the plurality of connecting posts 210, and the circles of glue around the connecting posts 210 are disconnected, but the edge of the bottom plate 120 provided with a positioning hole 121 is completely coated with a circle of glue.

It should be noted that the adhesive layer 300 may be configured of an integral structure, but is not limited thereto, and a circle of glue around each connecting post 210 may not be connected, depending on the specific situation. The circle of glue around each connecting post 210 is not connected to each other, so that the amount of glue can be saved and the material cost can be saved to a certain extent.

In the technical solution of the present application, the adhesive layer 300 may be configured of an integral structure, when the backplate 100 and the middle frame 200 need to be detached, the adhesive layer 300 can be removed as a whole, and the efficiency of removing the adhesive layer 300 as a whole is higher than that of detaching circles of glue around the connecting posts 210 one by one.

Referring to FIGS. 5 and 6, the backplate 100 includes a bottom plate 120. The bottom plate 120 includes the intermediate portion 122 and the edge portion 123 surrounding the intermediate portion 122. The positioning hole 121 is located at the edge portion 123. The intermediate portion 122 is projected in a direction away from the middle frame 200, i.e., a relative position of the edge portion 123 where the positioning hole 121 is located is lower and the relative position of the intermediate portion 122 is higher.

It should be noted that the bottom plate 120 may include the intermediate portion 122 and the edge portion 123 surrounding the intermediate portion 122, and the intermediate portion 122 protrudes in a direction away from the middle frame 200, but is not limited thereto, and the bottom plate 120 may also be provided in a flat plate structure, as the case may be. The backplate 100 is provided in a flat structure, and the backplate 100 is simpler in structure and easier to manufacture.

In the technical solution of the present application, the bottom plate 120 may include the intermediate portion 122 and the edge portion 123 surrounding the intermediate portion 122. The intermediate portion 122 protrudes in the direction away from the middle frame 200. When the edge portion 123 is applied with glue, the protruded intermediate portion 122 can play a blocking role to prevent the glue applied on the edge portion 123 from flowing to the intermediate portion 122, thereby ensuring the thickness of the applied glue to a certain extent and making the connection between the backplate 100 and the middle frame 200 firmer.

Embodiment 2

Referring to FIG. 5 to FIG. 8, the main difference between embodiment 2 and embodiment 1 is that the position of the annular groove 211 is different in the axial direction of the connecting post 210. At least a part of the annular groove 211 is located outside the positioning hole 121. In this embodiment, the annular groove 211 has a first annular area 213 and a second annular area 214 which are sequentially distributed and communicated in the axial direction of the connecting post 210. The first annular area 213 is located in the positioning hole 121, and the second annular area 214 is located outside the positioning hole 121 and on the side of the backplate 100 away from the middle frame 200, i.e., the annular groove 211 is partially located in the positioning hole 121, and the annular groove 211 is partially located outside the positioning hole 121.

Figure 7:
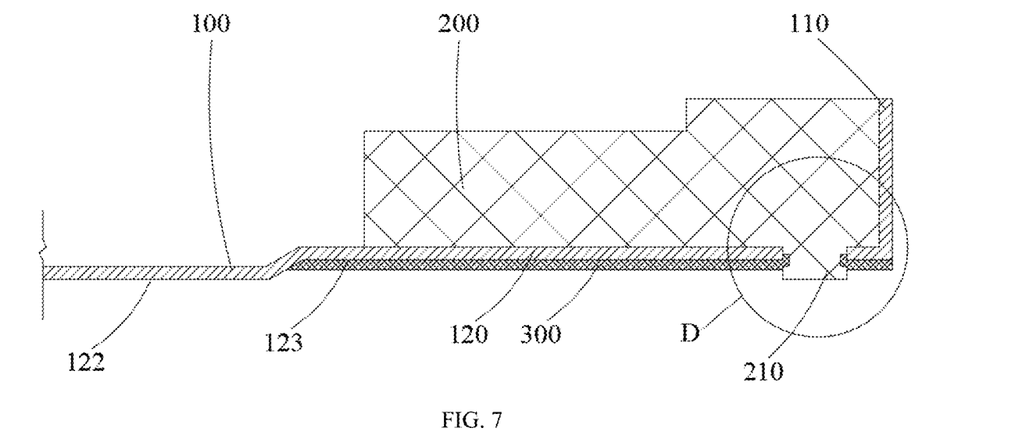
FIG. 7 is a structural diagram of the backlight module in embodiment 2 of the present application.
Figure 8:
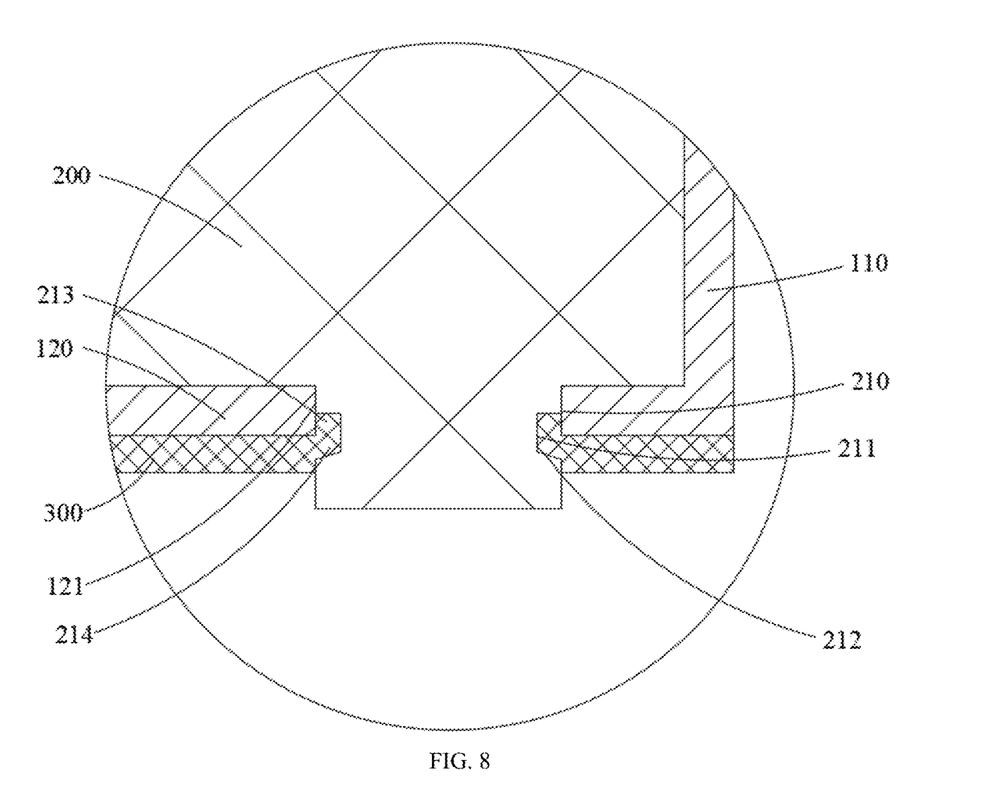
FIG. 8 is an enlarged view of position D of the backlight module in FIG. 7.

Under the condition that the thickness of glue applied to the bottom plate 120 is the same, when the first annular area 213 is located in the positioning hole 121 and the second annular area 214 is located outside the positioning hole 121, a part of the glue flows into the first annular area 213 in the positioning hole 121, thus increasing the thickness of the adhesive layer 300 and the bonding surface between the connecting post 210 and the bottom plate 120. The bottom plate 120 and the connecting post 210 are bonded more firmly, that is, the connection between the backplate 100 and the middle frame 200 is more firmly.

For example, a ratio of the first annular area 213 to the annular groove 211 in the axial direction of the connecting post 210 ranges from 20% to 80%, for example, a ratio of the first annular area 213 to the annular groove 211 ranges from 20%, 40%, 60% or 60%, etc. The ratio of the depth of the annular groove 211 to the radius of the connecting post 210 ranges from 5% to 50%. For example, the ratio of the depth of the annular groove 211 to the radius of the connecting post 210 ranges from 5%, 20%, 35%, 50%, etc.

The ratio of the first annular area 213 to the annular groove 211 ranges from 20% to 80%, so that the first annular area 213 is being so large as to interfere with the flow of glue into the annular groove 211, resulting in the annular groove 211 not being filled with glue. The first annular area 213 is not so small that it does not have the effect of enhancing the connection between the backplate 100 and the middle frame 200. The ratio of the depth of the annular groove 211 to the radius of the connecting post 210 is 5% to 50%, the depth of the annular groove 211 is not so large as to interfere with the structural strength of the connecting post 210, and the depth of the annular groove 211 is not too small, so as to prevent the adhesive layer 300 from being embedded in the annular groove 211 too small, resulting in a decrease in the connection strength between the backplate 100 and the middle frame 200.

Referring to FIGS. 7 to 8, an angle created between the side surface of the annular groove 211 away from the middle frame 200 and the bottom surface of the annular groove 211 is greater than 90 degrees, and the side surface of the annular groove 211 away from the middle frame 200 forms a flow-guiding inclined plane 212.

It should be noted that the angle created between the side surface of the annular groove 211 away from the middle frame 200 and the bottom surface of the annular groove 211 is greater than 90 degrees, but is not limited thereto, and the angle created between the side surface of the annular groove 211 away from the middle frame 200 and the bottom surface of the annular groove 211 is greater than 90 degrees or less than or equal to 90 degrees, as the case may be. When the angle created between the side surface of the annular groove 211 away from the middle frame 200 and the bottom surface of the annular groove 211 is greater than or equal to 90 degrees, the annular groove 211 is easier to be machined. When the angle created between the side surface of the annular groove 211 away from the middle frame 200 and the bottom surface of the annular groove 211 is less than 90 degrees, even if the adhesive layer 300 in the first annular area 213 falls off from the wall of the annular groove 211, the adhesive layer 300 in the first annular area 213 cannot be separated from the annular groove 211 due to the small opening of the annular groove 211, thereby ensuring that the adhesive layer 300 and the connecting post 210 can be glued tightly.

The angle created between the side surface of the annular groove 211 away from the middle frame 200 and the bottom surface of the annular groove 211 is greater than 90 degrees, and the side surface of the annular groove 211 away from the middle frame 200 forms a flow-guiding inclined plane 212, so that the glue applied on the side of the bottom plate 120 away from the middle frame 200 is more easily flowed into the annular groove 211, avoiding that the glue cannot fill the annular groove 211 to cause the connection strength between the backplate 100 and the middle frame 200 to be reduced.

Embodiment 3

Figure 9:
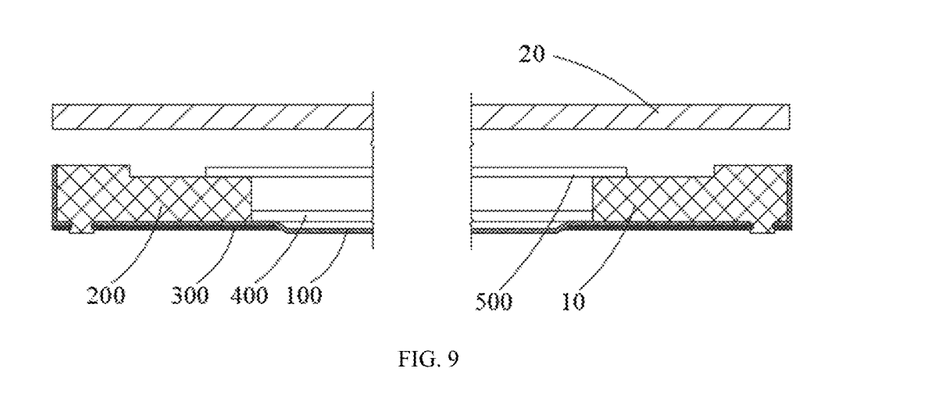
FIG. 9 is a structural diagram of a display device in embodiment 3 of the present application.

Referring to FIG. 9, the display device in this embodiment includes a backlight module 10 and a display panel 20. The display panel 20 is disposed on a side of the backlight module 10 away from the backplate 100.

It should be noted that the backlight module 10 further includes a lamp panel 400 and optical diaphragms 500. The lamp panel 400 may be disposed on the side of the backplate 100 close to the middle frame 200. The optical diaphragms 500 are disposed at intervals on the side of the lamp panel 400 away from the backplate 100. The relative position between the optical diaphragm 500 and the middle frame 200 may be set as appropriate. The backlight module 10 may include the backlight module 10 disclosed in embodiment 1 or embodiment 2, and the display panel 20 is disposed on a side of the backlight module 10 away from the backplate 100, that is, on a light-emitting side of the backlight module 10.

The backlight module 10 may include the backlight module 10 disclosed in embodiment 1 or 2. In the backlight module 10 disclosed in embodiments 1 and 2, the middle frame 200 is provided with a connecting post 210, the bottom plate 120 is provided with a positioning hole 121, the connecting post 210 is provided in the positioning hole 121, the connecting piece is disposed at the side of the bottom plate 120 away from the middle frame 200, and the connecting piece connects the bottom plate 120 and the connecting post 210, that is, the connecting piece connects the backplate 100 and the middle frame 200. Compared with the solution that the middle frame 200 and the bottom plate 120 are directly glued, it can be avoided that the optical diaphragm 500 is stuck by glue, resulting in abnormal display.

In addition to the display panel 20 and the backlight module 10, the display device also includes other necessary parts and components, in the case of the display, it can also include a housing, a main circuit board, a power line, etc., which can be supplemented by those skilled in the art according to the specific use requirements of the display device, and will not be described here.

The terms of "first", "second" and the like are for descriptive purposes only and cannot be construed as indicating or implying relative importance or implying the number of the indicated technical features. Thus, features defined with "first", "second" and the like may explicitly or implicitly include one or more of the features. In the description of the present application, "multiple" means two or more unless otherwise expressly specified.

In the present application, the terms "install", "connect" and the like are to be understood in a broad sense, unless otherwise expressly specified and limited, for example, it can be a fixed connection, may also be a detachable connection, or be integral; it can be a mechanical connection, can also be an electrical connection; it can be directly connection or indirectly connection through an intermediate medium, or it can be an internal connection of two elements or an interactive relationship of two elements. For those ordinarily skilled in the art, the specific meanings of the above terms in the present application will be understood according to the specific circumstances.

In the content of the description, illustrations of the reference terms "some embodiments," "example," etc. mean that specific features, structures, materials, or characteristics described in connection with the embodiment or example are encompassed in at least one embodiment or example of the present application. In this description, the schematic formulation of the above terms need not be directed to the same embodiments or examples. Further, the specific features, structures, materials or characteristics described may be combined in a suitable manner in any one or more embodiments or examples. Further, without contradicting one another, those skilled in the art may connect and combine different embodiments or examples described in this description and features of different embodiments or examples.

Although embodiments of the present application have been shown and described above, it will be understood that the above-mentioned embodiments are exemplary and cannot be construed as limiting the present application. Those of ordinary skill in the art may make changes, variations, alternatives and modifications to the above-mentioned embodiments within the scope of the present application. Therefore, any changes or modifications made in accordance with the claims and descriptions of the present application should fall within the scope of the patent of the present application.

What is claimed is:

1. A backlight module comprising:
    a middle frame provided with a connecting post;
    a backplate disposed on one side of the middle frame and provided with a positioning hole, wherein the connecting post is disposed in the positioning hole, and
    a connecting piece disposed at one side of the backplate away from the middle frame and connecting the backplate and the connecting post;
    wherein the connecting piece comprises an adhesive layer, and the backplate and the connecting post are bonded and connected by the adhesive layer, wherein the adhesive layer is disposed on the side of the bottom plate away from the middle frame;
    wherein the connecting post is protruded relative to the side of the backplate away from the middle frame;
    wherein a peripheral surface of the connecting post is provided with an annular groove, the annular groove is provided around an axis of the connecting post, and at least a part of the annular groove is located on the side of the backplate away from the middle frame in an axial direction of the connecting post; and
    wherein at least part of the adhesive layer is filled in the annular groove.

2. The backlight module according to claim 1, wherein the annular groove has a first annular area and a second annular area sequentially distributed and communicated in the axial direction of the connecting post;
    wherein the first annular area is located in the positioning hole; and
    wherein the second annular area is located outside the positioning hole and on the side of the backplate away from the middle frame.

3. The backlight module according to claim 2, wherein in the axial direction of the connecting post, a ratio of the first annular area to the annular groove ranges from 20% to 80%.

4. The backlight module according to claim 3, wherein a ratio of a depth of the annular groove to a radius of the connecting post ranges from 5% to 50%.

5. The backlight module according to claim 2, wherein a ratio of a depth of the annular groove to a radius of the connecting post ranges from 5% to 50%.

6. The backlight module according to claim 2, wherein an angle created between a side surface of the annular groove away from the middle frame and a bottom surface of the annular groove is greater than 90 degrees.

7. The backlight module according to claim 6, wherein the side surface of the annular groove away from the middle frame forms a flow-guiding inclined plane.

8. The backlight module according to claim 1, wherein the annular groove is integrally provided outside of the positioning hole.

9. The backlight module according to claim 1, wherein a plurality of connecting posts are provided and disposed at intervals around a center of the middle frame, and a plurality of positioning holes are provided and correspond to the connecting posts one to one; and
    wherein the adhesive layer is configured of an integrated structure and is filled in the annular groove of each of the plurality of connecting posts.

10. The backlight module according to claim 9, wherein the backlight comprises a bottom plate comprising an intermediate portion and an edge portion surrounding the intermediate portion, wherein the intermediate portion protrudes in a direction away from the middle frame, and the positioning hole is provided at the edge portion.

11. The backlight module according to claim 10, wherein in the axial direction of the connecting post, a height of the connecting post is greater than a thickness of the bottom plate.

12. A display device comprising:
    a backlight module; and
    a display panel disposed on a side of the backlight module away from a backplate, wherein the backlight module comprises:
        a middle frame provided with a connecting post;
        a backplate disposed on one side of the middle frame and provided with a positioning hole, wherein the connecting post is disposed in the positioning hole, and
        a connecting piece disposed at one side of the backplate away from the middle frame and connecting the backplate and the connecting post;
    wherein the connecting piece comprises an adhesive layer, and the backplate and the connecting post are bonded and connected by the adhesive layer, wherein the adhesive layer is disposed on the side of the bottom plate away from the middle frame;
    wherein the connecting post is protruded relative to the side of the backplate away from the middle frame;
    wherein a peripheral surface of the connecting post is provided with an annular groove, the annular groove is provided around an axis of the connecting post, and at least a part of the annular groove is located on the side of the backplate away from the middle frame in an axial direction of the connecting post; and
    wherein at least part of the adhesive layer is filled in the annular groove.

13. The display device according to claim 12, wherein the annular groove has a first annular area and a second annular area sequentially distributed and communicated in the axial direction of the connecting post;
    wherein the first annular area is located in the positioning hole; and
    wherein the second annular area is located outside the positioning hole and on the side of the backplate away from the middle frame.

14. The display device according to claim 13, wherein in the axial direction of the connecting post, a ratio of the first annular area to the annular groove ranges from 20% to 80%.

15. The display device according to claim 13, wherein a ratio of a depth of the annular groove to a radius of the connecting post ranges from 5% to 50%.

16. The display device according to claim 12, wherein an angle created between a side surface of the annular groove away from the middle frame and a bottom surface of the annular groove is greater than 90 degrees, and the side surface of the annular groove away from the middle frame forms a flow-guiding inclined plane.

* * * * *